United States Patent [19]

Godfrey et al.

[11] Patent Number: 5,022,012

[45] Date of Patent: Jun. 4, 1991

[54] ACOUSTIC SENSING ARRANGEMENTS

[75] Inventors: Leslie K. Godfrey, Wiltshire; Robert P. Lock, Dorset, both of England

[73] Assignee: Plessey Overseas Limited, Ilford, England

[21] Appl. No.: 501,941

[22] Filed: Mar. 30, 1990

[30] Foreign Application Priority Data

Mar. 31, 1989 [GB] United Kingdom ................. 8907314

[51] Int. Cl.[5] ................................................ H04B 1/59

[52] U.S. Cl. ........................................... 367/3; 367/15; 367/173

[58] Field of Search ................. 367/2, 3, 15, 165, 173; 181/402

[56] References Cited

U.S. PATENT DOCUMENTS 3,986,159 10/1976 Horn ....................................... 340/2

4,323,988 4/1982 Will et al. ........................... 367/173

FOREIGN PATENT DOCUMENTS 1533111 11/1978 United Kingdom .

1590873 6/1981 United Kingdom .

*Primary Examiner*—Charles T. Jordan

*Assistant Examiner*—J. Woodrow Eldred

*Attorney, Agent, or Firm*—Fleit, Jacobson, Cohn, Price, Holman & Stern

[57] ABSTRACT

An underwater sensing arrangement in which hydrophones are embodied in horizontally disposed arms of a hydrophone support structure adaptive to be suspended below the surface of the water and in which the support arms are elliptical and orientated so that they present the lowest resistance to horizontal flow of water past the structure and present the highest resistance or drag against movement.

19 Claims, 3 Drawing Sheets

ACOUSTIC SENSING ARRANGEMENTS

BACKGROUND OF THE INVENTION

This invention relates to acoustic sensing arrangements for use in underwater applications.

As the noise to be detected (e.g. noise from submarines) by such sensing arrangements becomes quieter, the acoustic noise produced by the detection device becomes more significant. This means that the acoustic sensor array must be well isolated from the motion of the surface water, and that the noise generated by water flow over the sensors and array structure must be reduced to a minimum. As isolation can never be 100% and, due to the presence of shear currents, there will always be some water flow over the sensor(s), some means is required to eliminate the effects of these movements. In addition, it is desirable that a single acoustic sensor assembly can be used to determine accurately the bearing of an acoustic source.

A sonobuoy consists of an acoustic sensor assembly suspended by a cable below a radio transmitter which floats on the sea surface. To achieve isolation of the acoustic sensor from the wave-induced motion of the floating radio transmitter unit known sonobuoys use a damped spring-mass system (i.e. decoupling system) comprising an elastic section (i.e. compliance) in the suspension cable and a highdrag sea anchor (i.e. drogue) at, or near, the acoustic sensor, to provide a large virtual mass. The compliance normally consists of a long section of high elasticity rubber to give low stiffness and the sea anchor may be a large diameter horizontal fabric disc with or without vertical vanes and erected by a spring ring or other collapsible framework. The vertical isolation is sometimes further improved by configuring the flotation unit as a spar buoy so that it does not follow the full motion of the sea surface. However, the spar buoy has the disadvantage that, in high sea states, it is more susceptible to washover and consequent loss of r.f. transmission. The effect of the decoupling is to reduce the vertical movement of the acoustic sensor to about one twentieth of the sea surface motion. The vertical components of the drogue (if fitted) reduce the horizontal flow due to shear currents over the sensor. Although the water flow over the acoustic sensor is much reduced by the decoupling system, there is still some cyclic vertical flow, and uni-directional horizontal flow. This generates noise due to vortex shedding etc.

BRIEF SUMMARY OF THE INVENTION

According to the present invention there is provided an acoustic sensing arrangement for use in underwater applications (e.g. sonobuoy) comprising a hydrophone support structure adapted to be suspended by a suspension cable, in which the support structure comprises in use a plurality of horizontally disposed support arms or staves embodying hydrophones for detecting underwater acoustic waves and in which the support arms are of elliptical or other similar cross-section and so orientated that they present the lowest resistance to horizontal flow of water past the structure and present the highest resistance or drag against movement in the vertical direction.

The high resistance to vertical movement of the support structure enables the previously mentioned drogue to be dispensed with.

The support structure preferably comprises four support arms or staves which extend outwardly at right-angles from a central hub part to which the suspension cable which may include an elastic section may be attached.

It may be arranged that the arms of the support structure are hinged to the hub part so that they can be folded up together and fitted within a long cylindrical casing.

In each support arm or stave hydrophones may be mounted on a printed wiring board which also carries the electronic circuits for hydrophone pre-amplifiers and for multiplexing of hydrophone outputs, if required. The spaces inside the support arms or staves which are not occupied by the hydrophones and electronics may be filled with a material which is acoustically matched to sea water or they may be perforated to allow free-flooding thereof.

The acoustic array will be suspended on a conventional cable and compliant link, and supported by a wave-following float when used as a sonobuoy.

BRIEF DESCRIPTION OF THE DRAWINGS

By way of example the present invention will now be described with reference to the accompanying drawings wherein.

DETAILED DESCRIPTION

Figure 1:
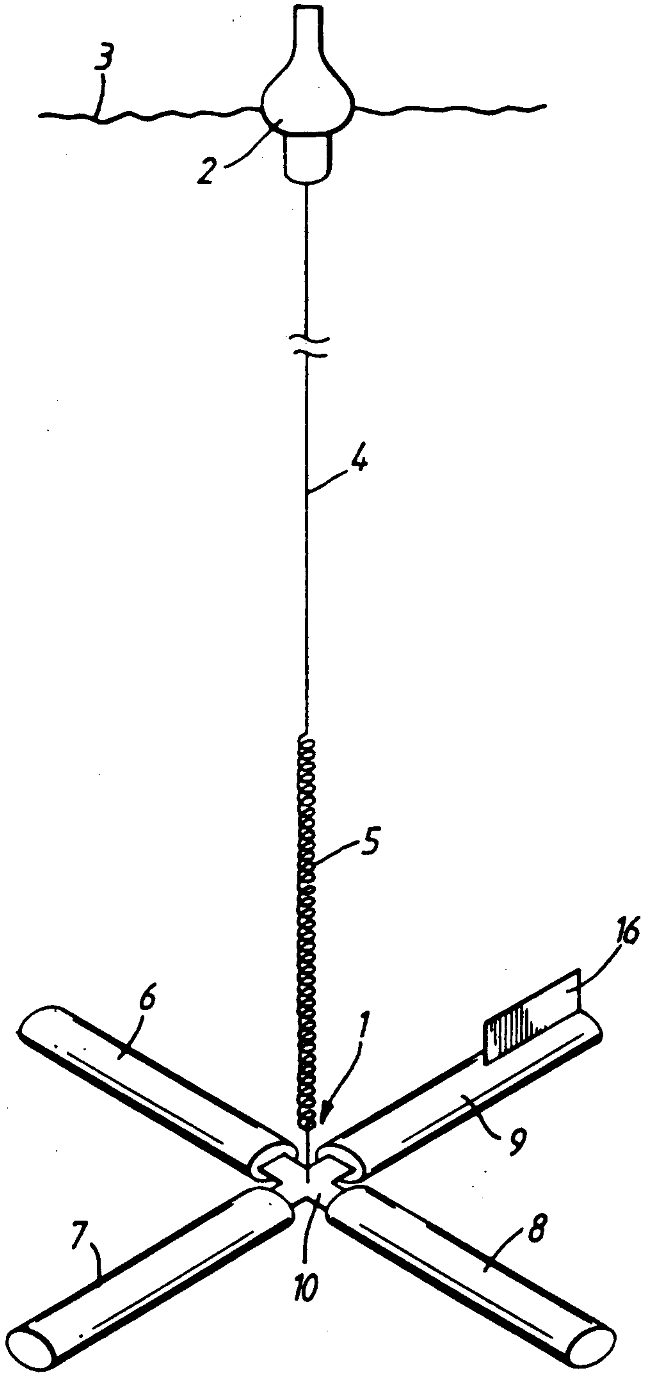
FIG. 1 is a schematic perspective view of an underwater acoustic sensing arrangement as part of a deployed sonobuoy in accordance with the invention.

Referring to the drawings the sonobuoy illustrated comprises a hydrophone support structure 1 which is suspended from a flotation unit 2 comprising a float and radio transmitter on the sea surface 3 by means of a suspension cable 4 including an elastic section or compliance 5. The elastic section serves to isolate the hydrophone support structure 1 from the wave-induced motion of the flotation unit 2 in order to reduce noise produced in the hydrophones of the sonobuoy.

In accordance with the invention the hydrophone support structure 1 comprises a plurality of horizontally disposed support arms which are shaped to present the lowest resistance to the flow of water horizontally across the structure whilst presenting the greatest resistance to movement in the vertical direction due to wave motion of the flotation unit 2.

In the particular embodiment illustrated the support structure comprises four support arms 6, 7, 8 and 9 which extend outwardly from a central hub part 10 to which the suspension cable 4 is attached.

Figures 2, 3:
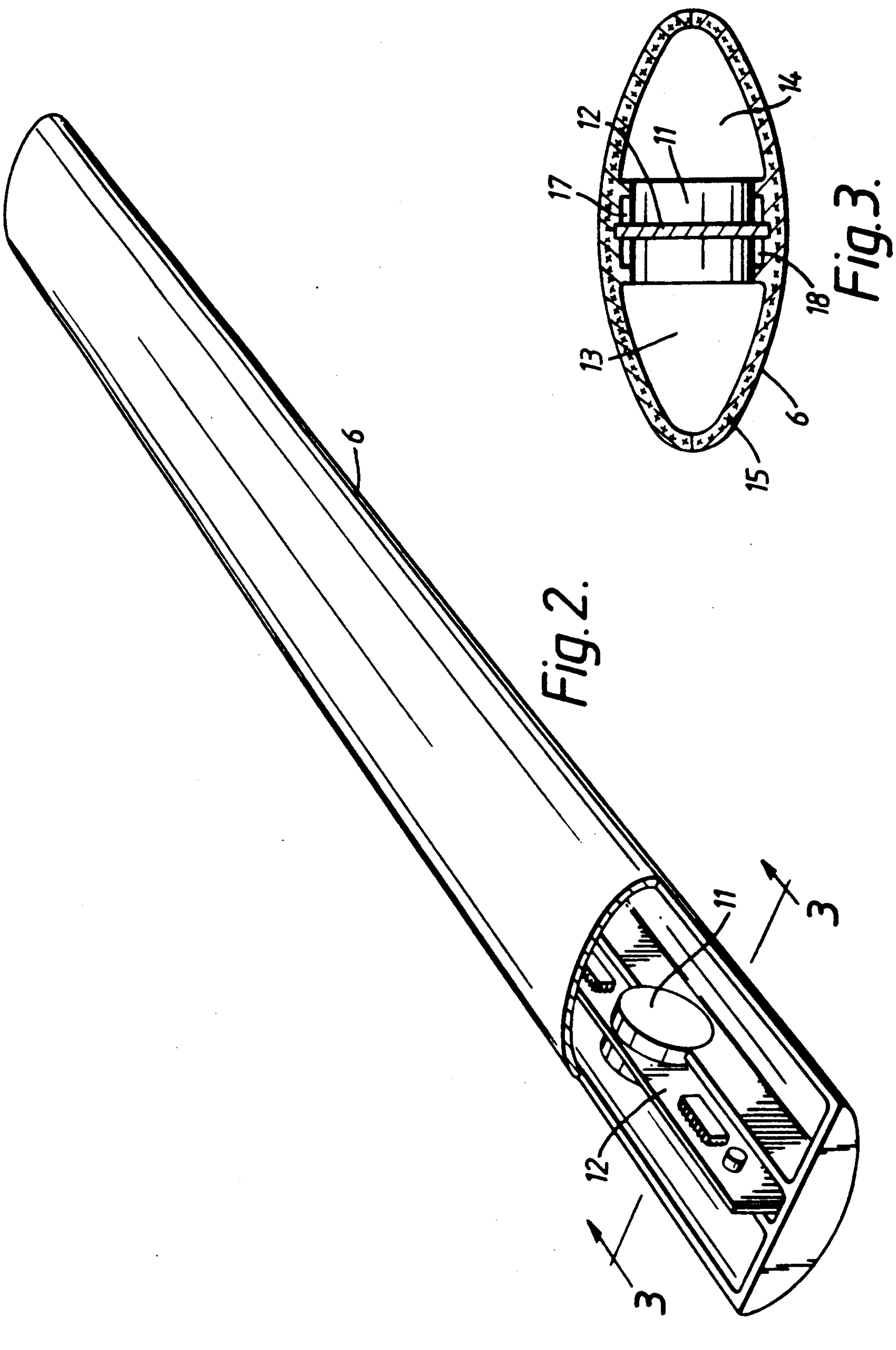
FIG. 2 is a perspective/broken away view of a supporting structure shown in FIG. 1.
FIG. 3 is a cross-sectional view of the support arm taken along line 3—3 in FIG. 2.

As can best be seen in FIGS. 2 and 3, the support arms, such as the arm 6, are of elliptical cross-section but other similar cross-sectional shapes could possibly be used.

These support arms embody hydrophones, such as that shown at 11, which are mounted on printed wiring boards, such as the board 12, which also carries the electronic circuits for hydrophones, pre-amplifiers and multiplexing, if required.

The internal compartments 13 and 14 of the arms may be filled with a suitable material acoustically matched to sea water or the walls of the compartments may be perforated or otherwise formed to allow free flooding of the arms. Compartments 17 and 18 may be sealed with suitable sealing material.

The support arms may include metallic mesh 15 which provides screening and reduces susceptibility to electrical noise. The support arm may alternatively be an open frame construction with the section containing the hydrophone being sealed and covered with a metallic mesh to provide flow noise reduction and electrical screening.

In order to align the support structure and hydrophone array with the water, flow vane 16 or equivalent (FIG. 1) may be attached to one of the support arms.

Figure 4:
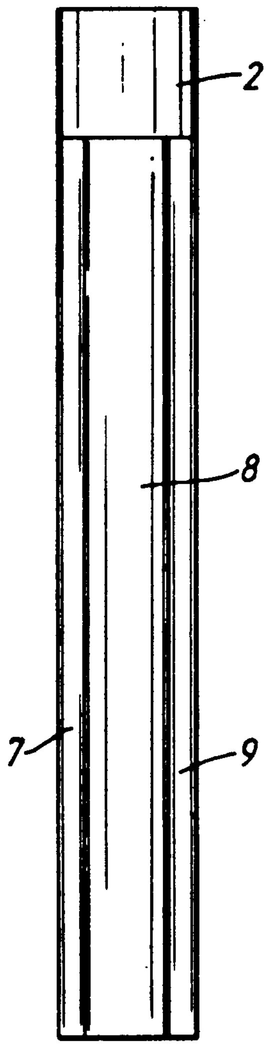
FIG. 4 is an elevational view of a folded or stowed configuration of the sonobuoy shown in FIG. 1.
Figure 5:
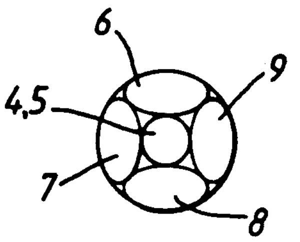
FIG. 5 is a schematic lower end view of FIG. 4.

The support arms 6 to 9 may be hingedly connected to the central hub part 10 (FIG. 1) so that they may be folded up as shown in FIG. 4 so that they enclose the suspension cable 4 and elastic section with the flotation unit 2 being located as shown. A parachute may also be accommodated at the top of the folded assembly which may initially be located within a long cylindrical casing.

As will be appreciated from the foregoing description of one embodiment, the arrangement and shaping of the hydrophone support arms contributes significantly to the reduction of noise in the hydrophone array thereby rendering the hydrophones more sensitive to acoustic waves impinging thereon from underwater noise sources (e.g. submarines).

We claim:

1. An underwater acoustic sensing device including a cable suspended hydrophone support structure comprising:

a plurality of elongated support arms connected together and disposed substantially horizontally; and hydrophones contained within each support arm for detecting underwater acoustic waves;

each arm having in transverse cross section a maximum horizontal dimension greater than the maximum vertical dimension thereof so that the resistance thereof to horizontal flow is less than the resistance to vertical flow.

2. An acoustic sensing device as claimed in claim 1 and further comprising:

a central hub part, said arms being connected to said central hub part and extending radially outwardly therefrom; and a suspension cable attached to said central hub part.

3. An acoustic sensing device as claimed in claim 2 wherein:

said plurality of support arms comprises four support arms arranged in an orthogonal array about said central hub part.

4. An acoustic sensing device as claimed in claim 2 wherein:

said support arms are hingedly connected to said central hub part to facilitate folding said support arms together.

5. An acoustic sensing device as claimed in claim 3 wherein:

said support arms are hingedly connected to said central hub part to facilitate folding said support arms together.

6. An acoustic sensing device as claimed in claim 1 and further comprising:

a printed wiring board mounted within each support arm for respective hydrophones.

7. An acoustic sensing device as claimed in claim 5 and further comprising:

a printed wiring board mounted within each support arm for respective hydrophones.

8. An acoustic sensing device as claimed in claim 6 and further comprising:

spaces inside each support arm not occupied by said hydrophones and printed wiring board; and material filling said spaces which is acoustically matched to sea water.

9. An acoustic sensing device as claimed in claim 7 and further comprising:

spaces inside each support arm not occupied by said hydrophones and printed wiring board; and material filling said spaces which is acoustically matched to sea water.

10. An acoustic sensing device as claimed in claim 1 and further comprising:

spaces inside each support arm not occupied by said hydrophones and printed wiring board; and perforations in each support arm to facilitate free-flooding of said spaces with ambient water.

11. An acoustic sensing device as claimed in claim 7 and further comprising:

spaces inside each support arm not occupied by said hydrophones and printed wiring board; and perforations in each support arm to facilitate free-flooding of said spaces with ambient water.

12. An acoustic sensing device as claimed in claim 2 wherein: said cable comprises a compliant link.

13. An acoustic sensing device as claimed in claim 9 wherein: said cable comprises a compliant link.

14. An acoustic sensing device as claimed in claim 2 and further comprising:

a wave-following float connected to said cable; and radio transmitter means within said float for transmitting signals in response to operation of said hydrophones.

15. An acoustic sensing device as claimed in claim 13 and further comprising:

a wave-following float connected to said cable; and radio transmitter means within said float for transmitting signals in response to operation of said hydrophones.

16. An acoustic sensing device as claimed in claim 1 and further comprising:

fin means attached to one of said support arms for aligning said hydrophone support structure with the direction of flow of ambient water.

17. An acoustic sensing device as claimed in claim 14 and further comprising:

fin means attached to one of said support arms for aligning said hydrophone support structure with the direction of flow of ambient water.

18. An acoustic sensing device as claimed in claim 1 wherein:

said support arms include metallic mesh for providing screening and reducing susceptibility to electrical noise.

19. An acoustic sensing device as claimed in claim 17 wherein:

said support arms include metallic mesh for providing screening and reducing susceptibility to electrical noise.

* * * * *